United States Patent
Zhou et al.

(10) Patent No.: US 12,039,197 B2
(45) Date of Patent: Jul. 16, 2024

(54) METHOD, ELECTRONIC DEVICE, AND COMPUTER PROGRAM PRODUCT FOR RESTORING DATA

(71) Applicant: EMC IP Holding Company LLC, Hopkinton, MA (US)

(72) Inventors: Yizhou Zhou, Chengdu (CN); Andy Li Ke, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/349,031

(22) Filed: Jun. 16, 2021

(65) Prior Publication Data

US 2022/0342600 A1 Oct. 27, 2022

(30) Foreign Application Priority Data

Apr. 21, 2021 (CN) .......................... 202110431717.1

(51) Int. Cl.
*G06F 3/06* (2006.01)
*G06F 7/14* (2006.01)

(52) U.S. Cl.
CPC .......... *G06F 3/0659* (2013.01); *G06F 3/0619* (2013.01); *G06F 3/065* (2013.01); *G06F 3/0673* (2013.01); *G06F 7/14* (2013.01)

(58) Field of Classification Search
CPC ...... G06F 3/0659; G06F 3/0619; G06F 3/065; G06F 3/0673; G06F 7/14
See application file for complete search history.

(56) References Cited

U.S. PATENT DOCUMENTS

| 7,739,464 | B1 * | 6/2010 | Coulter | G06F 11/1466 711/162 |
| 9,405,756 | B1 * | 8/2016 | Xavier | G06F 11/1446 |
| 2002/0023225 | A1 * | 2/2002 | Lomnes | G06F 3/0622 726/30 |
| 2008/0320209 | A1 * | 12/2008 | Lee | G06F 12/0246 711/E12.001 |
| 2012/0246118 | A1 * | 9/2012 | Feng | G06F 16/2308 707/682 |

(Continued)

OTHER PUBLICATIONS

Faronics, "Reduce IT Costs and Increase Productivity", 1996-2023, https://www.faronics.com/products/deep-freeze/enterprise.*

*Primary Examiner* — Eric Cardwell
(74) *Attorney, Agent, or Firm* — WOMBLE BOND DICKINSON (US) LLP (57) ABSTRACT

Embodiments of the present disclosure provide a method, an electronic device, and a computer program product for restoring data. The method described here includes: selecting a target time point at a storage system from multiple backup time points. The method further includes: determining a change in a data system in the storage system from the target time point to a current time point. The method further includes: overwriting the data system at the current time point based on the change. With the solution for restoring data of the present application, it is possible to reduce, based on the change in the data system since the target time point, the amount of data that needs to be retrieved in order to restore the current data system to a backup at the target time point, thereby achieving efficient data restoration.

16 Claims, 6 Drawing Sheets

(56) References Cited

U.S. PATENT DOCUMENTS

| | | | |
|---|---|---|---|
| 2014/0089264 A1* | 3/2014 | Talagala | G06F 3/065 |
| | | | 707/649 |
| 2015/0058556 A1* | 2/2015 | Hamedani | G06F 3/064 |
| | | | 711/114 |
| 2016/0350325 A1* | 12/2016 | Wang | G06F 3/0608 |
| 2017/0180394 A1* | 6/2017 | Crofton | G06F 21/64 |
| 2018/0137016 A1* | 5/2018 | Brown | G06F 11/1448 |
| 2018/0253362 A1* | 9/2018 | Reinecke | G06F 11/1471 |

* cited by examiner

METHOD, ELECTRONIC DEVICE, AND COMPUTER PROGRAM PRODUCT FOR RESTORING DATA

CROSS-REFERENCE TO RELATED APPLICATION

This patent application claims priority, under 35 U.S.C. § 119, of Chinese Patent Application No. 202110431717.1, filed Apr. 21, 2021, which is incorporated by reference in its entirety.

TECHNICAL FIELD

Embodiments of the present disclosure relate to the field of data storage, and in particular relate to a method, an electronic device, and a computer program product for restoring data.

BACKGROUND

In the field of data storage, data restoration is a very important topic. Data restoration can refer to retrieving target data backup from a backup repository for restoring the current data in a storage system to the target data backup. When the target data backup has a large amount of data, it may take much time to retrieve the target data backup from the backup repository.

SUMMARY OF THE INVENTION

In a first aspect of the present disclosure, a method for restoring data is provided. The method includes: selecting a target time point at a storage system from multiple backup time points. The method further includes: determining a change in a data system in the storage system from the target time point to a current time point. The method further includes: overwriting the data system at the current time point based on the change.

In a second aspect of the present disclosure, an electronic device is provided. The electronic device includes a processor and a memory coupled to the processor, the memory having instructions stored therein that, when executed by the processor, cause the device to execute actions. The actions include: selecting a target time point at a storage system from multiple backup time points. The actions further include: determining a change in a data system in the storage system from the target time point to a current time point. The actions further include: overwriting the data system at the current time point based on the change.

In a third aspect of the present disclosure, a computer program product is provided that is tangibly stored on a computer-readable medium and includes machine-executable instructions, wherein the machine-executable instructions, when executed, cause a machine to perform the method according to the first aspect.

In the embodiments of the present disclosure, with the solution for restoring data of the present application, it is possible to reduce, based on changes in the data system since the target time point, the amount of data that needs to be retrieved in order to restore the current data system to a backup at the target time point, thereby achieving efficient data restoration.

The Summary of the Invention is provided to introduce the selection of concepts in a simplified form, which will be further described in the Detailed Description below. The Summary of the Invention is neither intended to identify key features or main features of the embodiments of the present disclosure, nor intended to limit the scope of the present disclosure.

BRIEF DESCRIPTION OF THE DRAWINGS

The above and other objectives, features, and advantages of embodiments of the present disclosure will become more apparent by describing example embodiments of the present disclosure in more detail in combination with the accompanying drawings. In the example embodiments of the present disclosure, the same reference numerals generally represent the same parts.

DETAILED DESCRIPTION

The principles of the embodiments of the present disclosure will be described below with reference to several example embodiments shown in the accompanying drawings. Although preferred embodiments of the present disclosure are illustrated in the accompanying drawings, it should be understood that these embodiments are described only to enable those skilled in the art to better understand and then implement the embodiments of the present disclosure, and are not intended to impose any limitation to the scope of the present disclosure.

The term "include" and variants thereof used herein indicate open-ended inclusion, that is, "including but not limited to." Unless specifically stated, the term "or" means "and/or." The term "based on" means "based at least in part on." The terms "an example embodiment" and "some embodiments" mean "at least one example embodiment." The term "another embodiment" means "at least one further embodiment." The terms "first," "second," and the like may refer to different or identical objects. Other explicit and implicit definitions may also be included below.

As mentioned above, when the data backup has a large amount of data, it may take much time to retrieve the data backup directly from the backup repository. Therefore, solutions that can reduce the time required to restore data are needed.

According to embodiments of the present disclosure, a target time point is selected at a storage system from multiple backup time points. In this solution, a change in a data system in the storage system from the target time point to a current time point is determined. In this solution, the data system at the current time point is overwritten based on the change. In this manner, it is possible to reduce, based on the change in the data system since the target time point, the amount of data that needs to be retrieved in order to restore the current data system to a backup at the target time point, thereby achieving efficient data restoration.

The basic principles and several example embodiments of the present disclosure are described below with reference to FIGS. 1 to 5. It should be understood that these example embodiments are given only to enable those skilled in the art to better understand and thus implement the embodiments of the present disclosure, and are not intended to limit the scope of the present disclosure in any way.

Figure 1:
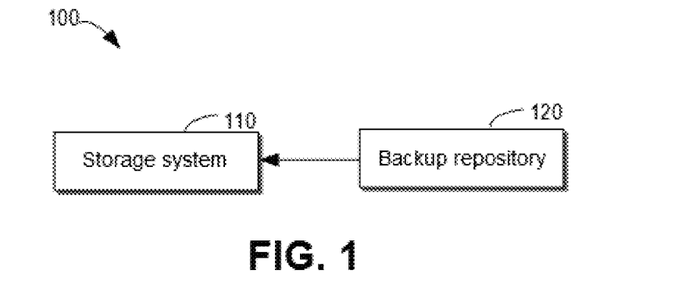
FIG. 1 illustrates a schematic diagram of an example environment in which embodiments of the present disclosure can be implemented.

FIG. 1 illustrates example environment 100 in which embodiments of the present disclosure can be implemented. As shown in FIG. 1, environment 100 includes storage system 110 and backup repository 120. Storage system 110 can be a main memory for storing user data. Backup repository 120 can be used to back up user data that is in storage system 110. Storage system 110 and backup repository 120 can utilize a data block-level or file-level data system to store and manage the user data. Backup repository 120 may include backups of the data system in storage system 110 at multiple backup time points. Storage system 110 and backup repository 120 can be non-volatile storage devices. Storage system 110 and backup repository 120 can be located in different physical storage devices.

It should be understood that environment 100 shown in FIG. 1 is merely an example and should not constitute any limitation to the functions and scope of the implementations described in the present disclosure.

Figure 2:
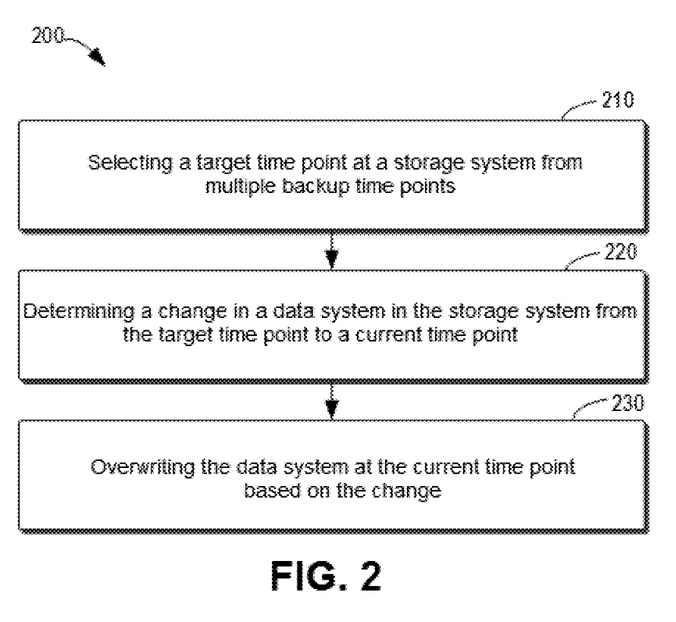
FIG. 2 illustrates a flow chart of an example method for restoring data according to some embodiments of the present disclosure.

FIG. 2 illustrates a flow chart of example method 200 for restoring data according to embodiments of the present disclosure. Method 200 can be performed, for example, in example environment 100 as shown in FIG. 1. It should be understood that method 200 may also include additional actions not shown and/or may omit actions shown, and the scope of the present disclosure is not limited in this regard. Method 200 is described in detail below in connection with FIG. 1.

At block 210, a target time point is selected at storage system 110 from multiple backup time points. Backup repository 120 may include multiple backups of the data system in storage system 110 at different backup time points. Storage system 110 can select a target time point from multiple backup time points according to the user's needs, so as to restore the data system at the current time point to the data system at the target time point.

At block 220, a change in the data system in storage system 110 from the target time point to a current time point is determined. The change in the data system from the target time point to the current time point can be a file-level change or a data block-level change. Examples of a file-level change may include: file deletion, update, addition, and renaming. A data block-level change may mean that data in a field of a data block is overwritten. A variety of methods can be used to determine a change in the data system between the target time point and the current time point. The process of determining a change in the data system in storage system 110 from the target time point to the current time point will be described in detail below with reference to FIGS. 3-5.

Figure 3:
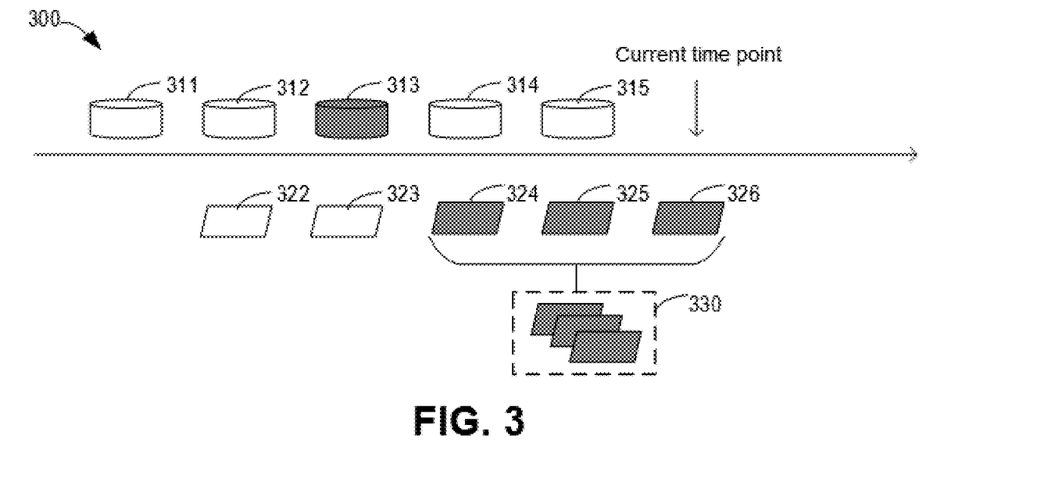
FIG. 3 illustrates a schematic diagram of a process of determining a change in a data system by merging change logs according to some embodiments of the present disclosure.

In some embodiments, a change tracking program can be installed in storage system 110 for tracking changes in the data system in storage system 110 in real time. FIG. 3 illustrates a schematic diagram of a process of determining a change in a data system by merging change logs according to some embodiments of the present disclosure. FIG. 3 illustrates backups 311-315 (collectively referred to hereinafter as 310) of the data system in backup repository 120 at multiple backup time points. Backup 313, shown in gray, can be a backup of the data system at the target time point. As data in storage system 110 is backed up, storage system 110 can record changes in the data system tracked between the last backup and this backup as change logs, such as, for example, change logs 322-326 (collectively referred to hereinafter as 320) shown in FIG. 3. As shown, change log 322 can be used to record a change in the data system tracked between the previous backup 311 and this backup 312. Change logs 320 can be stored in storage system 110. Storage system 110 can determine the change in the data system between the target time point and the current time point by merging a set of change logs 330 between the target time point and the current time point. In this manner, it is possible to only use the change logs stored in storage system 110 to determine the change in the data system between the target time point and the current time point, without having to retrieve a backup at the target time point for comparison with the current data system.

In some embodiments, the changes in the data system may be file-level changes. Change logs 320 can record operations on files of the data system. For example, change log 324 can record that an update operation was performed on file A, and that a delete operation was performed on file B. The change in the data system between the target time point and the current time point can refer to a list of operations on files in the data system between the target time point and the current time point. The list of operations on the files can be determined by merging the set of change logs 330.

In some embodiments, merging the set of change logs 330 may include merging an update operation preceding a delete operation on the same file recorded in the set of change logs 330 into a delete operation. For example, an update operation is recorded in a first change log 324 as having been performed on file A, and a deletion operation is recorded in a subsequent second change log 325 as having been performed on file A. In this case, when merging the first change log 324 and the second change log 325, the update operation and the delete operation on file A can be merged into a delete operation on file A. Alternatively or additionally, merging the set of change logs 330 may include merging multiple update operations on the same file recorded in the set of change logs 330 into one update operation. Alternatively or additionally, merging the set of change logs 330 may include merging multiple rename operations on the same file recorded in the set of change logs 330 into one rename operation. Alternatively or additionally, when recording changes in the data system between neighboring backups as change logs, a similar merge operation can also be performed. In this manner, duplicate information in change logs 320 and the list of operations can be effectively reduced, thereby improving the efficiency of restoring data.

In some embodiments, the changes in the data system may be data block-level changes. Change logs 320 may record changed fields in data blocks of the data system. For example, change log 324 may record that field {64, 104857600} was changed, i.e., the data in field {64, 104857600} was overwritten. The change in the data system between the target time point and the current time point can refer to a list of changed fields in the data system between the target time point and the current time point. The list of changed fields in the data system can be determined by merging the set of change logs 330. The list of changed fields can be determined by performing a union operation on the changed fields in the set of change logs 330. For example, the changed A field {64,104857600} is recorded in the first change log 324, and the changed B field {8,104857600} is recorded in the subsequent second change log 325. In this case, when merging the first change log 324 and the second change log 325, the changed A field {64, 104857600} and the changed B field {8,104857600} can be merged into the changed field {8,104857600}. Additionally, when recording the changed fields in the data blocks of the data system in change logs 320, a similar merge operation can also be performed. In this manner, duplicate information in the list of changed fields can be effectively reduced, thereby improving the efficiency of restoring data.

Figure 4:
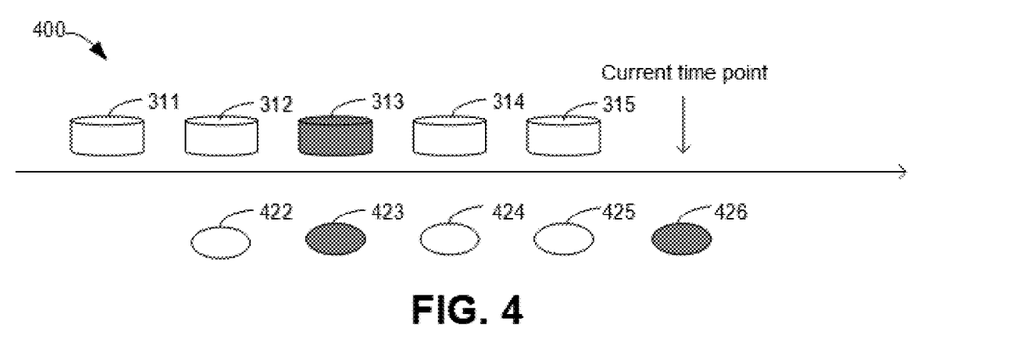
FIG. 4 illustrates a schematic diagram of a process of determining a change in a data system by comparison of images according to some embodiments of the present disclosure.

In some embodiments, a preset function in the operating system can be used to determine changes in the data system without installing a change tracking program in storage system 110. In some embodiments, the image generation function of the operating system can be used to determine changes in the data system. FIG. 4 illustrates a schematic diagram of a process of determining a change in a data system by comparison of images according to some embodiments of the present disclosure. Similarly, FIG. 4 shows backups 310 of the data system in backup repository 120 at multiple backup time points. Backup 313, shown in gray, can be a backup of the data system at the target time point.

In some embodiments, when backing up the data system in storage system 110, images of the data system at corresponding time points can be generated, such as images 422-425 shown in FIG. 4 (hereinafter collectively referred to as 420). Therefore, storage system 110 can store images 420 of the data system at different backup time points. Image 423, shown in gray, may be the target image of the data system at the target time point. In order to determine the change in the data system from the target time point to the current time point, a temporary image 426 of the data system at the current time point can be generated. A list of changed fields in data blocks of the data system between the target time point and the current time point can be determined by comparing temporary image 426 of the data system at the current time point with image 423 of the data system at the target time point. In this manner, it is possible to only use images 420 stored in storage system 110 to determine the change in the data system between the target time point and the current time point, without having to retrieve a backup at the target time point for comparison with the current data system.

Figure 5:
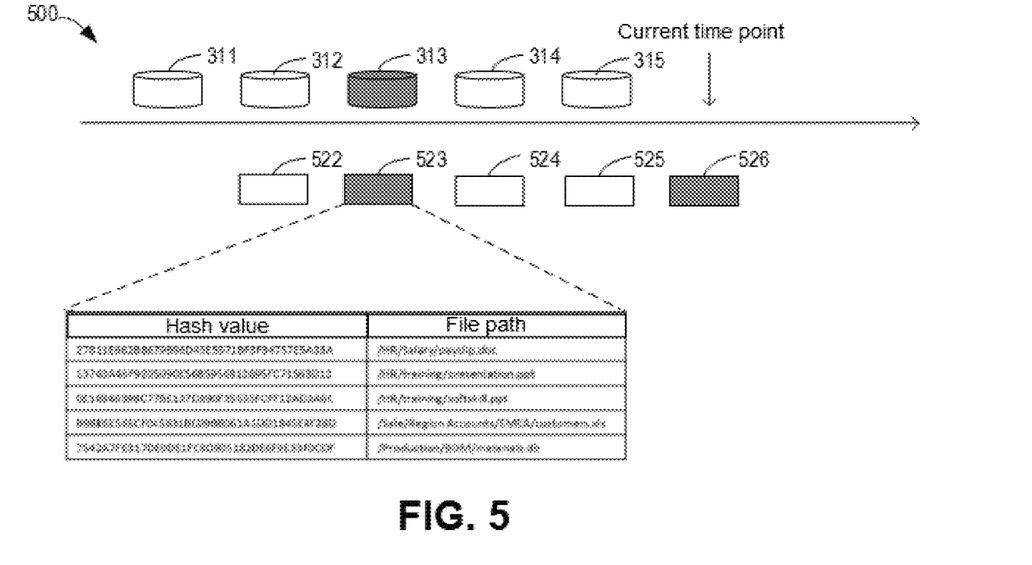
FIG. 5 illustrates a schematic diagram of a process of determining a change in a data system by comparison of hash tables according to some embodiments of the present disclosure.

In some embodiments, the hash table generation function of the operating system can be used to determine changes in the data system. FIG. 5 illustrates a schematic diagram of a process of determining a change in a data system by comparison of hash tables according to some embodiments of the present disclosure. Similarly, FIG. 5 shows backups 310 of the data system in backup repository 120 at multiple backup time points. Backup 313, shown in gray, can be a backup of the data system at the target time point.

In some embodiments, when backing up the data system in storage system 110, hash tables of the data system at corresponding time points can be generated, such as hash tables 522-525 shown in FIG. 5 (hereinafter collectively referred to as 520). Therefore, storage system 110 can store hash tables 520 corresponding to the data system at different backup time points. As shown in FIG. 5, the hash table may include a corresponding entry for each file in the data system. The hash table can have two attributes: a hash value generated based on the file data and the file path, and a file path string. Temporary hash table 526 of the data system at the current time point can be generated and compared to target hash table 523 of the data system at the target time point, so as to determine the change in the data system from the target time point to the current time point.

In some embodiments, by comparing temporary hash table 526 of the data system at the current time point with target hash table 523 of the data system at the target time point, a list of operations on the files of the data system between the target time point and the current time point can be determined. In some embodiments, the changed files in the data system between the target time point and the current time point can be found by comparing the hash values in the hash tables, and the corresponding operations on the files can be determined. Since the generation of hash values is related to file data and file paths, it can be determined that a file with the same hash value at the target time point and the current time point is an unchanged file. In addition, for a file only having an entry in target hash table 523, it can be determined that a delete operation was performed on this file between the target time point and the current time point. For a file only having an entry in temporary hash table 526, it can be determined that this file was added between the target time point and the current time point. For a file having entries in both temporary hash table 526 and target hash table 523 but with different hash values, it can be determined that an update operation was performed on this file between the target time point and the current time point. In this manner, it is possible to only use hash tables 520 stored in storage system 110 to determine the change in the data system between the target time point and the current time point, without having to retrieve a backup at the target time point for comparison with the current data system.

Continuing to refer to FIG. 2, at block 230, the data system at the current time point is overwritten based on the change. Storage system 110 can overwrite the data system at the current time point based on the change in the data system between the target time point and the current time point. In some embodiments, the change in the data system may be a list of operations on files in the data system between the target time point and the current time point. For example, the list of operations may include a delete operation on file A and an add operation adding file B.

In some embodiments, storage system 110 can retrieve file data corresponding to the list of operations from the backup of the data system at the target time point in backup repository 120. Storage system 110 can also overwrite the data system at the current time point by performing the list of operations in reverse on the data system at the current time point, based on the file data. For example, storage system 110 can retrieve the file data of file A from the backup of the data system at the target time point in backup repository 120, and perform a reverse operation corresponding to the delete operation for file A on the data system at the current time point. In other words, storage system 110 can add the retrieved file data of file A to the data system at the current time point.

In some embodiments, depending on the type of operation, storage system 110 may not need to retrieve file data corresponding to the list of operations from the backup of the data system at the target time point in backup repository 120. Storage system 110 can also overwrite the data system at the current time point by directly performing the list of operations in reverse on the data system at the current time point. For example, for file B added between the target time point and the current time point, storage system 110 can directly perform the operation of deleting file B on the data system without retrieving any data from the backup repository. Therefore, using the embodiments of the present disclosure, the amount of data that needs to be retrieved for data restoration can be reduced, thereby increasing the efficiency of data restoration.

In some embodiments, the change in the data system may be a list of changed fields in data blocks in the data system between the target time point and the current time point. For example, the list of changed fields may include a changed A field {64,104857600} and a changed B field {8,104857600}. Storage system 110 can retrieve the data of the list of changed fields from the backup of the data system at the target time point in backup repository 120. For example, storage system 110 can retrieve the data of the A field {64,104857600} and the B field {8,104857600} in the backup. Storage system 110 can also overwrite the list of changed fields in the data blocks of the data system at the current time point based on the retrieved data. For example, storage system 110 can overwrite the changed A field {64,104857600} and B field {8,104857600} in the data blocks of the data system at the current time point.

In this manner, it is possible to reduce, based on changes in the data system since the target time point, the amount of data that needs to be retrieved in order to restore the current data system to a backup at the target time point, thereby achieving efficient data restoration.

Figure 6:
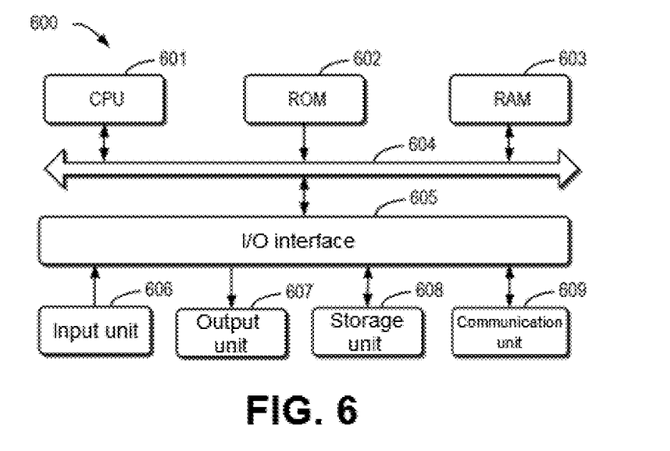
FIG. 6 illustrates a block diagram of an example computing device that can be used to implement embodiments of the present disclosure.

FIG. 6 illustrates a schematic block diagram of example device 600 that can be used to implement the embodiments of the present disclosure. For example, device 600 can be implemented at storage system 110 as shown in FIG. 1. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

Multiple components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices over a computer network such as an Internet and/or various telecommunication networks.

The various processes and processing described above, such as method 200, may be executed by processing unit 601. For example, in some embodiments, method 200 may be implemented as a computer software program that is tangibly included in a machine-readable medium, such as storage unit 608. In some embodiments, part or all of the computer program may be loaded and/or installed onto device 600 via ROM 602 and/or communication unit 609. When the computer program is loaded to RAM 603 and executed by CPU 601, one or more actions of method 200 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a SRAM, a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, an instruction set architecture (ISA) instructions, machine instructions, machine-dependent instructions, microcode, firmware instructions, state setting data, or in one or more programming languages source code or object code written in any combination of the programming languages, including an object oriented programming language—such as Smalltalk, C++ like and conventional procedural programming languages—such as the "C" language or similar programming languages. The computer-readable program instructions may be completely executed on a user computer, partially executed on a user computer, executed as a stand-alone software package, partially executed on a user computer and partially executed on a remote computer, or completely executed on a remote computer or server. When a remote computer is involved, the remote computer can be connected to a user computer through any kind of network, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed basically in parallel, and sometimes they may also be executed in an inverse order, which depends on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or the improvements to technologies on the market, or to enable other persons of ordinary skill in the art to understand the embodiments disclosed herein.

The invention claimed is:

1. A method for restoring data, the method comprising:
   selecting a target time point at a storage system from a plurality of backup time points, wherein the storage system comprises a data system, and wherein the plurality of backup time points correspond to a plurality of backups of the data system that are stored in a backup repository, wherein a plurality of operations were performed on files in the data system between the target time point and a current time point, the plurality of operations comprising a first operation performed on a first one of the files and a second operation performed on the first one of the files, wherein the first operation precedes the second operation and the second operation is a delete operation;
   producing a temporary hash table based on the files in the data system at the current time point and corresponding file paths;
   determining a target hash table that is generated based on the files in the data system at the target time point and corresponding file paths;
   producing, by comparing the target hash table with the temporary hash table, a list of operations performed on the files in the data system between the target time point and the current time point, wherein the list of operations comprise the second operation without the first operation;
   retrieving file data corresponding to the list of operations from the one or more of the plurality of backups of the data system at the target time point in the backup repository; and
   overwriting the data system at the current time point by performing the list of operations in reverse on the data system at the current time point based on the file data.

2. The method according to claim 1, further comprising:
   determining a first set of change logs between the target time point and the current time point, each change log recording a change in the data system between a corresponding backup time point and a previous backup time point; and
   determining a change in the files in the data system between the target time point and the current time point by merging the first set of change logs.

3. The method according to claim 2, wherein each change log records one or more of the plurality of operations on the files in the data system between the corresponding backup time point and the previous backup time point, the one or more of the plurality of operations comprising at least one of rename, add, and update operations; and
   wherein determining the change in the files in the data system between the target time point and the current time point by merging the first set of change logs comprises determining the list of operations performed on the files in the data system based on merging multiple rename operations on a second one of the files recorded in the first set of change logs into one rename operation.

4. The method according to claim 2, wherein each change log records changed fields in data blocks in the data system between the corresponding backup time point and the previous backup time point; and
   wherein determining the change in the files in the data system between the target time point and the current time point by merging the first set of change logs comprises: determining a list of changed fields in the data system by performing a union operation on changed fields in the first set of change logs.

5. The method according to claim 4, further comprising:
retrieving data of the list of changed fields from the one or more of the plurality of backups of the data system at the target time point in the backup repository; and
overwriting, based on the data, the list of changed fields in data blocks of the data system at the current time point.

6. The method according to claim 1, further comprising:
determining an image of the data system at the current time point; and
determining a list of changed fields in data blocks of the data system between the target time point and the current time point by comparing an image of the data system at the current time point with an image of the data system at the target time point.

7. An electronic device, comprising:
a processor; and
a memory coupled to the processor, the memory having instructions stored therein, which when executed by the processor, cause the device to perform actions, the actions comprising:
selecting a target time point at a storage system from a plurality of backup time points, wherein the storage system comprises a data system, and wherein the plurality of backup time points correspond to a plurality of backups of the data system that are stored in a backup repository, wherein a plurality of operations were performed on files in the data system between the target time point and a current time point, the plurality of operations comprising a first operation performed on a first one of the files and a second operation performed on the first one of the files, wherein the first operation precedes the second operation and the second operation is a delete operation;
producing a temporary hash table based on the files in the data system at the current time point and corresponding file paths;
determining a target hash table that is generated based on the files in the data system at the target time point and corresponding file paths;
producing, by comparing the target hash table with the temporary hash table, a list of operations performed on the files in the data system between the target time point and the current time point, wherein the list of operations comprise the second operation without the first operation;
retrieving file data corresponding to the list of operations from the one or more of the plurality of backups of the data system at the target time point in the backup repository; and
overwriting the data system at the current time point by performing the list of operations in reverse on the data system at the current time point based on the file data.

8. The device according to claim 7, wherein the actions further comprise:
determining a first set of change logs between the target time point and the current time point, each change log recording a change in the data system between a corresponding backup time point and a previous backup time point; and
determining a change in the files in the data system between the target time point and the current time point by merging the first set of change logs.

9. The device according to claim 8, wherein each change log records one or more of the plurality of operations on the files in the data system between the corresponding backup time point and the previous backup time point, the one or more of the plurality of operations comprising at least one of rename, add, and update operations; and
wherein determining the change in the files in the data system between the target time point and the current time point by merging the first set of change logs comprises determining the list of operations performed on the files in the data system based on
merging multiple rename operations on a second one of the files recorded in the first set of change logs into one rename operation.

10. The device according to claim 8, wherein each change log records changed fields in data blocks in the data system between the corresponding backup time point and the previous backup time point; and
wherein determining the change in the files in the data system between the target time point and the current time point by merging the first set of change logs comprises: determining a list of changed fields in the data system by performing a union operation on changed fields in the first set of change logs.

11. The device according to claim 10, wherein the actions further comprise:
retrieving data of the list of changed fields from the one or more of the plurality of backups of the data system at the target time point in the backup repository; and
overwriting, based on the data, the list of changed fields in data blocks of the data system at the current time point.

12. The device according to claim 7, wherein the actions further comprise:
determining an image of the data system at the current time point; and
determining a list of changed fields in data blocks of the data system between the target time point and the current time point by comparing an image of the data system at the current time point with an image of the data system at the target time point.

13. A computer program product tangibly stored on a computer-readable medium and comprising machine-executable instructions, wherein the machine-executable instructions, when executed, cause a machine to perform actions, the actions comprising:
selecting a target time point at a storage system from a plurality of backup time points, wherein the storage system comprises a data system, and wherein the plurality of backup time points correspond to a plurality of backups of the data system that are stored in a backup repository, wherein a plurality of operations were performed on files in the data system between the target time point and a current time point, the plurality of operations comprising a first operation performed on a first one of the files and a second operation performed on the first one of the files, wherein the first operation precedes the second operation and the second operation is a delete operation;
producing a temporary hash table based on the files in the data system at the current time point and corresponding file paths;
determining a target hash table that is generated based on the files in the data system at the target time point and corresponding file paths;
producing, by comparing the target hash table with the temporary hash table, a list of operations performed on the files in the data system between the target time point and the current time point, wherein the list of operations comprise the second operation without the first operation;

retrieving file data corresponding to the list of operations from the one or more of the plurality of backups of the data system at the target time point in the backup repository; and overwriting the data system at the current time point by performing the list of operations in reverse on the data system at the current time point based on the file data.

14. The computer program product according to claim 13, wherein the actions further comprise:

determining a first set of change logs between the target time point and the current time point, each change log recording a change in the data system between a corresponding backup time point and a previous backup time point; and determining the change in files in the data system between the target time point and the current time point by merging the first set of change logs.

15. The computer program product according to claim 14, wherein each change log records one or more of the plurality of operations on the files in the data system between the corresponding backup time point and the previous backup time point, the one or more of the plurality of operations comprising at least one of rename, add, and update operations; and wherein determining the change in the files in the data system between the target time point and the current time point by merging the first set of change logs comprises determining the list of operations performed on the files in the data system based on merging multiple rename operations on a second one of the files recorded in the first set of change logs into one rename operation.

16. The computer program product according to claim 14, wherein each change log records changed fields in data blocks in the data system between the corresponding backup time point and the previous backup time point; and wherein determining the change in the files in the data system between the target time point and the current time point by merging the first set of change logs comprises: determining a list of changed fields in the data system by performing a union operation on changed fields in the first set of change logs.

\* \* \* \* \*